Sept. 9, 1952          J. O. KIRWAN          2,609,691
PORTABLE ALTIMETER
Filed April 4, 1947          2 SHEETS—SHEET 1
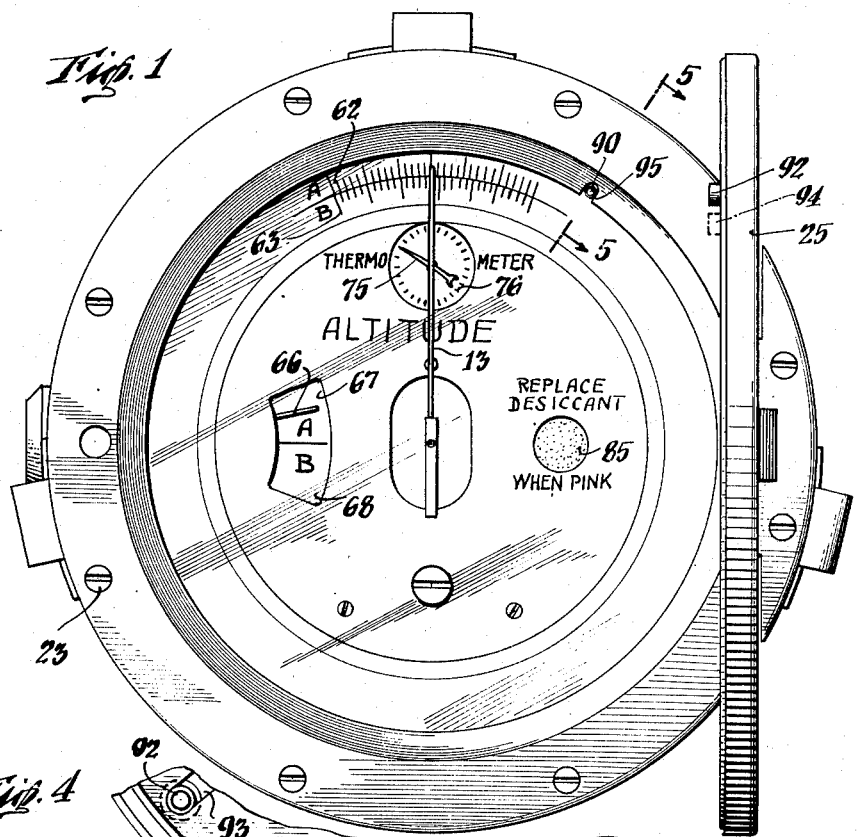
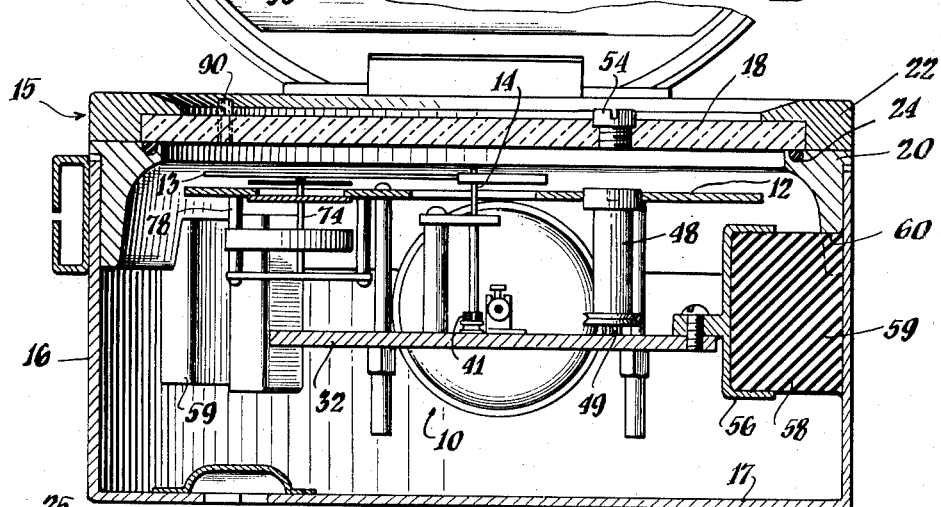
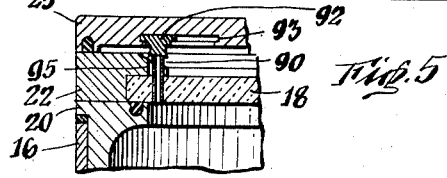
INVENTOR.
John O. Kirwan
BY
Robert B. Dunham
ATTORNEY

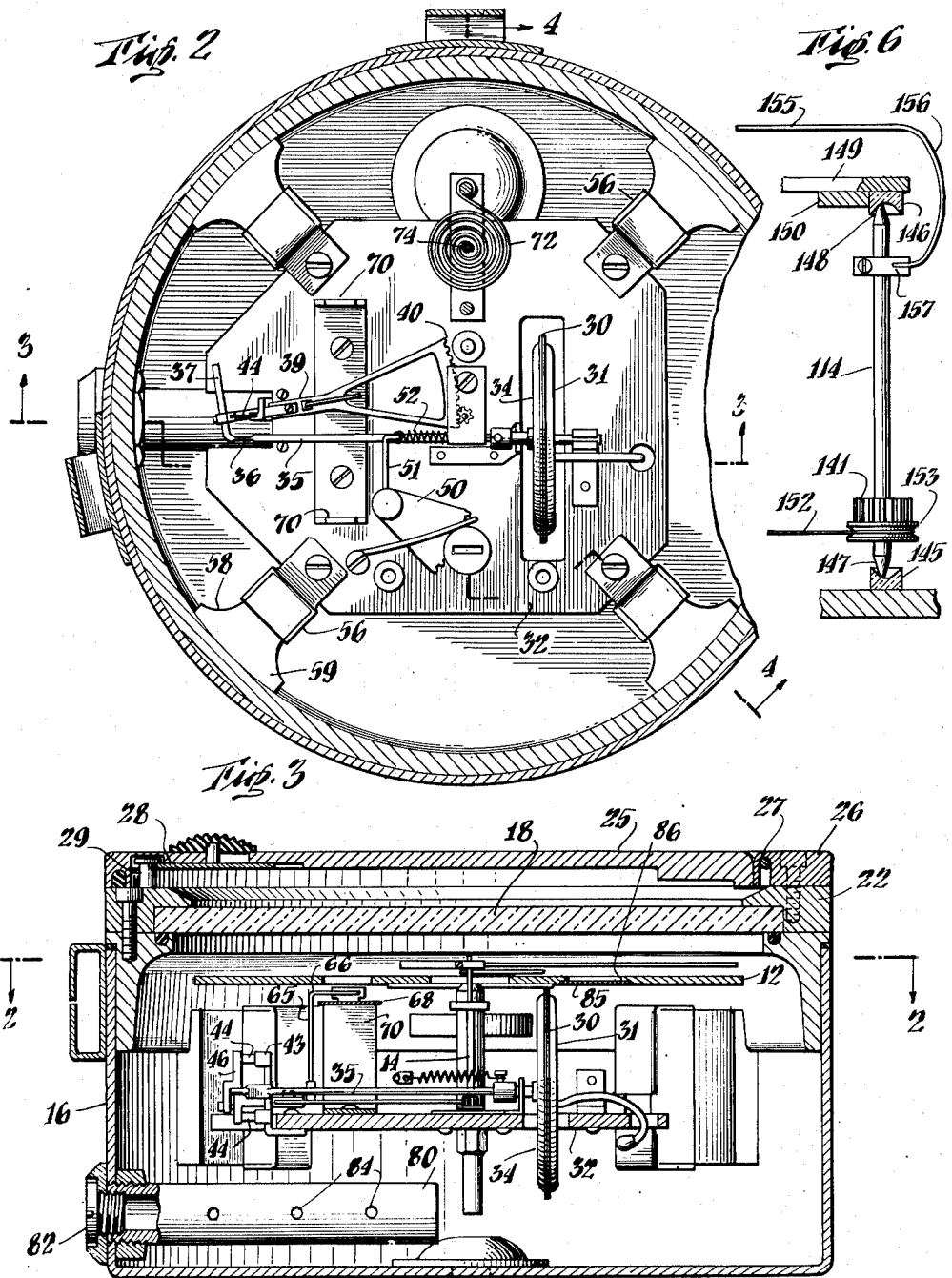

Patented Sept. 9, 1952

2,609,691

UNITED STATES PATENT OFFICE 2,609,691

PORTABLE ALTIMETER

John O. Kirwan, Bloomfield, N. J., assignor to Wallace & Tiernan Products, Inc., Belleville, N. J., a corporation of New Jersey Application April 4, 1947, Serial No. 739,493

15 Claims. (Cl. 73—386)

This invention relates particularly to portable altimeters and its chief object is to provide an altimeter which is rugged and reliable, which is readily portable and which at the same time is proof against adverse effects of atmosphere, weather and rough handling, and yet is highly sensitive and accurate.

As used for topographical or like surveys and observations, a portable altimeter comprises essentially a barometric instrument contained in a carrying case and having a scale which directly or by ready conversion indicates altitude or changes of altitude, as measured, for example, in feet. For usefully accurate results the pressure-responsive means should be highly sensitive and should provide faithful and reproducible indications with little or no effect due to external conditions other than atmospheric pressure. Since the pressure-sensitive instrumentalities are necessarily delicate in their response and must be made and adjusted with an extraordinarily high degree of precision, it has been found that care should be taken to prevent damage or other impairment of the movement under a wide variety of circumstances. Likewise since readings may sometimes have to be taken under conditions of shock or vibration, as in a moving vehicle, provision for stability of the instantaneous pointer indication is important.

There are also further criteria to be satisfied in an altitude-measuring instrument intended for portable service. For example, to avoid changes in the operating characteristics of delicate pressure-detecting parts it has been found very desirable to keep them in as constant an atmospheric condition as possible, the optimum situation being a maintenance of dry, clean air in and about the movement at all times. In addition, for maximum accuracy or greatest range of altitude, or for both purposes, it is particularly advantageous to have a scale that is spread out to as great an extent as may be achieved within the limitations of portability, e. g. with due regard for such physical size of the dial and such nature of the pressure-sensitive instrumentality, as may be feasible for a device of portable dimensions. Provisions should also be included, too, for facilitating such correction as may be required because of changes in the temperature of the air, it being understood that the relation between pressure and altitude is dependent to a small, but known or determinable extent upon the temperature.

Accordingly, a more specific object of the present invention is to provide an improved altimeter of the character described, embodying effective means for realization of the several criteria mentioned above. Thus, certain particular objects of the invention are directed to the incorporation, in such apparatus, of novel structure for mounting and enclosing the sensitive instrumentalities, so as greatly to reduce the possibility of damage due to moisture or other undesirable atmospheric conditions or due to shock or rough handling, and also so as to afford a remarkable stability and fidelity of indication at all times. Likewise other objects include the provision of improved dial and indicating instrumentalities, cooperatively embodied with structure otherwise peculiarly appropriate for a portable altimeter in the respects noted above, so as to attain a desirably extended and yet easily read scale arrangement and to facilitate necessary compensations and corrections during actual operations for the measurement of altitude.

To these and other ends certain advantageous structure embodying the present improvements is hereinbelow described and shown in the accompanying drawings, by way of example as illustrating the principles underlying the invention and its several features and combinations.

Referring to the drawings:

Fig. 1 is a plan view of one form of the improved portable altimeter, with the cover raised for observation;

Fig. 2 is a horizontal section of the device of Fig. 1, taken on line 2—2 of Fig. 3;

Fig. 3 is a vertical section on line 3—3 of Fig. 2, with the cover closed;

Fig. 4 is a vertical section on line 4—4 of Fig. 2, i. e. a line following different successive directions as shown, for convenience in illustrating certain parts;

Fig. 5 is a fragmentary vertical section on line 5—5 of Fig. 1 but with the cover in closed position, and Fig. 6 is a greatly enlarged fragmentary elevational view, partly in vertical section, of a modified pointer shaft and bearing arrangement suitable for instruments of this type.

Referring to Figs. 1 to 5 inclusive, the illustrated instrument comprises a pressure-responsive movement generally designated 10 carrying a dial plate 12 about which a pointer 13 swings, the pointer being mounted on a central, vertical pointer shaft 14 of the movement 10. The described structure is enclosed within a case generally designated 15 and comprising a cylindrical housing 16 having a closed bottom 17 and a transparent face 18 of "lucite," glass, or the like. The upper part of the housing 16 carries an inwardly flanged ring 20 in sealed relation therewith, and a cooperating flanged ring 22 is clamped by appropriate screws 23 to the ring 20. The annular recess between the flanges of these rings receives the peripheral edge of the transparent face or crystal 18, and when the upper ring 22 is tightened down, the crystal is pressed against an annular elastic gasket 24 in the upper face of the ring 20 so that the interior of the case is effectively sealed against communication with the outside atmosphere except through means hereinbelow described.

A cover 25 is hinged at 26 to one side of the ring 22, conveniently by means of a wire pintle 27 which may have a bent or otherwise stressed portion (not specifically shown) that will bias the cover to, or hold it in a raised position. The cover may have a releasable lock comprising a sliding catch 28 adapted to engage the head of a stud 29 to hold the cover in closed position as shown in Fig. 3.

Although any of a variety of barometric or like instrumentalities may constitute the means generally designated 10, the drawings illustrate a device embodying certain features described and claimed in the copending application of Charles F. Wallace, Serial No. 734,983, filed March 15, 1947. Reference being conveniently made to that application and to patents therein mentioned for further details and alternatives appropriate to such devices, a brief description of the pressure-sensitive movement will suffice here. A sealed elastic box or bellows 30 is mounted, by attachment to the center of one vertical face 31, to a base plate 32 and from the opposite vertical face 34 of the elastic box, a rod 35 projects, to be displaced axially in accordance with changes of pressure in the atmosphere surrounding the box. By a flexible, resilient portion 36 the outer end of the rod is linked to a short arm 37 adjustably clamped, i. e. for adjustment of the effective length of the arm, at one end of a lever 39 which at its further end carries a gear segment 40 meshing with a pinion 41 on the pointer shaft 14. The lever 39 is pivoted, at or near the point of attachment of the arm 37, to a supporting bracket 43, by means of leaf spring elements 44, 44 that are generally aligned with the lever, each being secured to the bracket and to a corresponding end of a vertical cross member 46 at the end of the lever.

In consequence, as changes of pressure displace the bellows face 34 relative to the secured face, 31, axial movement of the rod 35 rocks the lever 39 about its fulcrum 43—44, and the corresponding angular displacement of the teeth 40 rotates the pointer shaft 14 and swings the pointer 13 over the dial 12. A vertical shaft 48 having a slotted head projecting in or through the dial 12 carries a pinion 49 meshing with a gear segment 50 disposed to rock and thus move an arm 51 connected by a spring 52, under tension, to the face 34 of the bellows, or as here shown to the nearby point on the rod 35. By adjustment of the shaft 48, the tension on the bellows is varied and consequently provision is afforded for zero-set adjustment of the device. For access to the slotted head of the shaft 48 a plug 54 is removably threaded in the transparent face element 18, immediately above the end of the shaft.

Whereas in some cases other mounting structure for the described means in the case 15 may be employed, a peculiarly shock-resistant, elastic support is shown in the drawings. An appropriately rigid part of the barometer device, such as the base plate 32, carries a plurality of outwardly facing rectangular cups 56. Although more or less of these supporting elements can be used in some instances, four such devices are here shown, respectively facing in directions at right angles to each other, i. e. toward the inner surface of the cylindrical wall 16. Each cup 56 carries a relatively massive plug or block-like element 58 of resilient material, which is shaped to fit snugly at one end in the cup and which at its outer end has a widened portion 59 and a curved outer surface, the latter conforming with the interior surface of the wall 16. In the device shown, the depending skirt of the ring 20 is machined to provide a recess 60 for each member 58, i. e. a notch through which the upper part of the latter reaches the wall 16. The notches 60 help to locate the rubber parts 58 properly during assembly, and also provide additional surfaces for cementing the parts in place.

Although useful results may be had with other types of rubber or elastic materials, a particularly satisfactory composition for the blocks 58 is sponge rubber (or a sponge structure of other resilient plastic) of the interconnecting cell type, i. e. preferably as distinguished from the discrete or closed cell type of sponge. A material of this sort has been found to have a dashpot action, so to speak, under the particular circumstances here involved, thus providing not only a resilience to take up shocks and vibration imparted to the case 15, but also the effect of damping the response of the elastic material to such shocks, and thus preventing transmission or establishment of vibrations in the supported mechanism. The specific T-shape of the supporting blocks 58, and their proportions involving a configuration somewhat elongated in a direction perpendicular to the plane of the T, have been found particularly desirable, in that the mounting element then affords substantially the same characteristic of response or deflection for shocks or stresses in each of three directions. An effectively secure and permanent mounting of the elements 58 is achieved simply with a suitable adhesive or cementing material between the rubber and the adjacent metal structures, i. e. the casing 16 and the cups 56.

It has been found that a resilient mounting of the type shown, embodying the sponge rubber blocks, is greatly superior to ordinary types of metallic spring mounting, e. g. with coil springs under compression or tension, since springs sufficiently stiff to avoid an impact between the instrument supporting plate and the outer wall under conditions of severe shock (as when the apparatus is dropped), are relatively ineffective for absorption of minor shocks and vibration.

With a pressure-sensitive device providing large mechanical amplification of the contraction and expansion of the elastic box, as by the arrangement of levers and gearing shown, it is possible to have the pointer 13 make more than one revolution, in fact here two revolutions, for a useful range of positions of the bellows wall 34. Accordingly the dial plate 12 carries two concentric scales 62, 63 that may be read consecutively (and may extend through a complete circle of which only a fragment is shown in the drawings) to indicate the complete range of pressures or altitudes determinable with the device. In order to make it immediately apparent which of the two scales is to be read at any given time, the lever 39 of the pressure-responsive means carries an upstanding arm 65 provided with a transverse pointer 66 adapted to sweep through a rather small arc beneath a corresponding opening 67 in the dial plate 12. A supplementary dial element 68 carried on sheet metal arms 70 upstanding from the base 32, is placed beneath the path of the pointer 66 so as to be visible through the opening 67.

Thus where the main dial indicia constitute two series 62, 63, which may be correspondingly identified as scales A and B, the separate dial element 68 may be inscribed with a single division into two areas designated to correspond, i. e. as A and B, and so arranged that when one half of the gear teeth 40 on the lever 39 are in engagement with the pinion 41 for readings intended to be observed on scale A, the supplemental pointer 66 appears above the region marked A. Similarly for the other half of the gear teeth 40, where the main pointer 13 is to be read on scale B, the pointer 66 will automatically be positioned in the field B of the scale 68. Thus in this way the instrumentalities just described provide an effective revolution indicator, telling the operator at once which of the concentric scales A and B should be read to ascertain the true significance of the position of the pointer 13.

For optimum accuracy of altitude determinations in many cases, the detected pressures should be corrected for the air temperature, and such correction is greatly facilitated by providing a thermometer in combination with the described structure. Although other types may be used, the temperature responsive element here shown by way of example comprises a spiral of thermally sensitive metallic ribbon 72 having an outer end fixed and its inner end secured to a vertical shaft 74 which projects through the dial plate 12 and carries a pointer 75 adapted to sweep around a temperature scale 76 on the face of the dial plate. The bearings for the shaft 74 and the support for the outer end of the spiral ribbon 72 are secured to appropriate supporting elements 78 on the underside of the dial plate. Thus changes in temperature cause the coil 72 to wind or unwind and to turn the pointer shaft 74 so that an appropriate reading of temperature is afforded on the same dial, so to speak, with the pressure or altitude readings that are to be corrected, it being understood that an appropriate correction table or chart (not shown) may be provided with the apparatus, for example on the underside of the cover 25, which is exposed in the open position.

As indicated hereinabove it is particularly important to maintain, as continuously as possible at all times, a condition of clean, dry air within the base 15, i. e. adjacent the sensitive parts of the instrument. Thus an appropriate drying means such as a desiccant chemical of which silica gel is an example, may be contained in a tubular holder 80 that is mounted endwise on the inner face of the housing wall 16 and that has a threaded plug 82, removable from the outside of the housing for replacement of the desiccant from time to time. Appropriate openings 84 are provided in the tube 80 for communication of its contained hygroscopic or like material with the atmosphere inside the case.

The means for maintaining dry atmosphere in the housing also includes a moisture-responsive element, having a simple and yet effective form, and to that end comprising a small piece 85 of absorbent sheet material such as heavy filter paper. The sheet element 85 is secured on the underface of the dial plate 12, being pressed into a recessed or counterbored portion of an opening 86 through which the element 85 may be visually observed on the face of the dial. This paper element is impregnated with a humidity indicator, such as cobalt chloride. So deposited, cobalt chloride has a blue or pale blue color as long as the surrounding atmosphere is reasonably dry, but changes to pink in a relatively moist atmosphere, i. e. when the humidity of the air in the case 15 approaches a value that might be detrimental to the contained instrument. As shown, the outer surface of the dial plate may carry a suitable legend directing the operator to replace the desiccant material, i. e. in the tube 80, when the humidity element shows pink and thus indicates that the desiccant has approached saturation and is no longer serving to keep the air dry.

Since the entire structure of the housing portion 16, the transparent face 18 and the associated securing parts are arranged in a sealed relation so as to prevent access of humid air, dust and other undesired substances to the instrument movement, special provision is made for communication of the pressure-sensitive device with the external air at desired times, and only at such times. To that end the illustrated apparatus includes a passage constituted by a small, tubular, metallic insert 90 in the transparent face 18. So situated, the passage is adapted to be closed by a valve or closure element 92, advantageously made of rubber, Koroseal or other resilient material mounted on the underside of the cover 25. Thus, as shown in Fig. 5, when the cover is closed and locked by the parts 28, 29, the closure 92 compressibly engages the upstanding end of the tubular insert 90 and effectively seals the latter against passage of air to the interior of the case. The closure element 92 has an enlarged base mounted in an undercut groove 93 in the cover, so that it can be slid to an alternative position 94 out of registration with the tube 90 when special circumstances make it undesirable to seal the instrument.

It will be noted that the tube 90 advantageously projects above the face of the transparent member 18, for effective engagement by the closure 92 and also to prevent particles of dust or the like from being swept into the case through the passage, for instance when the face 18 is wiped to clean it. As shown, the inner edge of the ring 22 may have a notch 95, the tube 90 being then so positioned on the member 18 that it fits within the notch. In this way, the tubular member is automatically located, upon assembly or reassembly of the instrument, so as to come directly under the sealing member 92. The actual diameter of opening through the tube 90 can be very small, e. g. $\frac{1}{16}$ inch or less, to minimize any extensive flow of air into and out of the case, while at the same time providing ample communication for prompt establishment of pressure equality between the interior and exterior of the case whenever the cover is opened. In this way accurate pressure readings are obtainable, and yet access of moisture, dust or the like is rendered practically negligible, i. e. is prevented whenever the instrument is not in use and is minimized at all times during actual readings.

Although the bearing arrangements for the main pointer shaft 14 are amply satisfactory for many purposes, Fig. 6 shows an improved bearing structure which greatly reduces any slight deviations of pointer position that may occur when the instrument is held in an appreciably non-horizontal position. For example, if the requirements of sensitivity and accuracy are such that the tip of the pointer 13 must not, on tilting the instrument, deviate more than 0.020 inch from its position with the instrument horizontal, the usual types of bearing will often permit only a very small tilt, e. g. plus or minus three degrees. In the special arrangement of Fig. 6, which allows a much greater tilt, the vertical pointer shaft 114 that carries a pinion 141 to be engaged by the gear segment of the pressure-sensitive movement, is seated in and between appropriately concave bearings 145, 146, for instance jewel bearings. To cooperate with the latter, the ends of the shaft 114 are correspondingly pointed or nearly pointed as at 147, 148.

Immediately adjacent the upper bearing 146 and conveniently mounted on the underside of the corresponding bearing support 149, a small permanent magnet 150 exerts a constant magnetic force on the upper end of the shaft 114, the latter being constructed of paramagnetic material such as steel or iron. The actual magnetic attraction need not be large in absolute value, and hence the shaft 114 can be satisfactorily made of stainless steel or other moderately paramagnetic substance. The magnet may be quite small, e. g. having dimensions of the order of ⅛ inch, and although other magnet steels or alloys can sometimes be used, it is preferably made of a material such as Alnico, having very high retentivity. The effect of the magnet 150 is to maintain a very slight but constant displacement of the upper end of the shaft within the curved cavity of the jewel 146. Since the nearly pointed configuration of the shaft (which is actually of a minutely spherical contour at its "point") provides an essential point contact within the jewel bearing, the shaft, as it turns, tends to keep its axis in a single, fixed position even though the instrument is tilted very substantially from the horizontal.

While similar means may be provided for the lower end of the shaft, a corresponding result is there obtained, in cooperation with the magnet 150 at the upper end, by tensioning means of the character described and claimed in the copending application of Charles F. Wallace, Serial No. 517,411, filed January 7, 1944, now Patent No. 2,431,098, granted November 18, 1947. Such means, primarily designed to prevent backlash in the gearing, i. e. between the pinion 141 and its cooperating segment gear such as the element 49 in Fig. 2, comprises a filament 152 having one end secured to the periphery of a drum 153 on the pointer shaft and the other end secured to an appropriate spring (not shown) at an end of the gear segment, e. g. at one end of the gear teeth 49. The filament is wrapped around the drum 153 to a greater or less extent as the pinion turns, thereby maintaining a constant sidewise tension on the latter. Thus in the present device the lower end 147 of the shaft, being shaped like the upper end 148, is similarly urged to a constant position within the curved cavity of the jewel 145.

The pointer 155 may be carried above the supporting member 149 by an offset arm 156 extending from a collar 157 on the shaft 114; or if the pointer must make more than one revolution, it may be mounted in the manner of Figs. 1 to 4 but below the upper bearing 146, which with its associated magnet is carried by the support 149 (in the form of a spider, if desired), then extending over and above the dial. As stated, the pointer shaft 114 is constantly biased toward one side, radially of its axis, in both of its jewel bearings, and it appears that under such circumstances a substantial tilt of the instrument has little effect on the actual position of the pointer tip. For instance, where the maximum permissible aberration of the pointer is .020 inch, the critical tilt angle may be as much as plus or minus 20 degrees, i. e. the greatest angle at which the instrument may be inclined while the accuracy of its reading remains unimpaired beyond the permissible limit. It may be explained that in an altimeter having a dial about 4½ inches or so in diameter, wherein approximately one revolution (say 330°) represents a range of 2000 feet, a pointer shift of .020 inch corresponds to about three feet of altitude. The described arrangement so minimizes the effect of play in the bearings that the pointer aberration can be kept at smaller values throughout a considerable tilt of the instrument, reaching the stated limit only at an inclination of about 20° from the horizontal.

It will now be seen that the portable altimeter of the present invention, for example as shown in the several figures of the drawings, constitutes a remarkably rugged and yet highly sensitive device, which is unaffected over long periods of time by relatively unfavorable conditions of handling, atmosphere and the like. The parts are effectively sealed against all but a very minimum of communication with the external atmosphere, and undesired effects of vibration, shock, humidity and even tilting of the instrument are avoided to a remarkable degree. Nevertheless a full accuracy of response is maintained, conveniently over a multiple scale, i. e. a scale extending through more than one revolution of the movable element.

It will also be appreciated that whereas the described structure is primarily designed for a portable altimeter and is characterized by peculiarly effective cooperation in such a device, the several specific features, combinations and sub-combinations shown are capable of independent use, e. g. in altimeters or other sensitive instruments and apparatus.

It is to be understood that the invention is not limited to the specific structures herein shown and described but may be carried out in other ways without departure from its spirit as defined by the following claims.

I claim:
1. In a portable pressure-responsive measuring device, in combination, a case having a transparent face, a pressure-sensitive instrument having supporting structure and disposed within said case, said instrument having indicating means carried by said supporting structure and disposed within the case for observation through said face, a plurality of elastic sponge elements positioned intermediate said supporting structure and said case, and a plurality of cups mounted on said structure and extending outwardly therefrom toward said case, each of said elements having a portion fastened to said case and a portion snugly fitted into one of said cups, to provide the sole support for said instrument, structure and indicating means, whereby said instrument, structure and indicating means are resiliently isolated from said case in all directions.

2. In a measuring device, in combination, a case having vertical wall structure, a sensitive instrument having supporting structure and disposed within said case, and a plurality of elastic sponge elements extending from said supporting structure to said wall structure to provide the sole support of the instrument and supporting structure in the case, each of said elements having a T-shaped plan and a vertical thickness comparable to its other dimensions, and each of said elements being disposed with the shank of the T secured to the instrument supporting structure and the outer side of the T secured to the inner face of said vertical wall structure.

3. In a measuring device, in combination, a case having vertical wall structure, a sensitive instrument having supporting structure and disposed within said case, and a plurality of elements composed of elastic sponge material of the interconnecting cell type and extending horizontally from said supporting structure to said wall structure, to provide the sole support of the instrument and supporting structure in the case, each of said elements having T-shaped plan and a vertical thickness comparable to its other dimensions, said supporting structure carrying a plurality of cup-shaped parts each surrounding the end of the shank of a corresponding element, each of said elements having the said end of its shank adhesively secured in the corresponding cup-shaped part and having the outer side of the arm of the T adhesively secured to the inner face of said vertical wall structure.

4. A sealed, shock-proof, portable, pressure-responsive measuring device comprising, in combination, a pressure-sensitive instrument having supporting structure, a wall structure outside of said supporting structure, a plurality of elastic sponge elements each adhesively secured to said supporting structure and to a portion of said wall structure facing the supporting structure, to provide the sole support of said instrument and supporting structure upon said wall structure, indicating means carried by said supporting structure and actuated by the instrument, and closure means cooperating with said wall structure and adapted to prevent access of the atmosphere to said instrument except at times of desired actual use, said closure means comprising a transparent face disposed for observation of the indicating means therethrough, a movable cover adapted to be seated over said face, said face having a passage therethrough for communication between the outside atmosphere and the interior of the closure means, and a closure element carried by the cover and cooperable with the said face to close said passage when the cover is seated over the face.

5. In a portable altimeter, in combination, a sealed case having a transparent face and a movable cover adapted to be seated over said face, a pressure-sensitive instrument having indicating means and disposed within said case for observation of said indicating means through said face, said face having a passage therethrough for communication of the external atmospheric pressure to the instrument, and a closure element carried by the cover and cooperable with said face to close said passage when the cover is seated over the face.

6. In a pressure-responsive measuring device, in combination, a pressure-sensitive instrument, a sealed case for the instrument having a movable cover fitting over a transparent predetermined part of the surface of said case, said instrument having indicating means cooperatively arranged with said case to be visible through said predetermined part, said case including a passage through said predetermined part, and said cover comprising a closure for said passage, adapted to engage and close the latter when the cover is seated over said predetermined part.

7. The measuring device described in claim 6, wherein the case includes a transparent surface, the indicating means being arranged for observation through said transparent surface, and a conduit element mounted in the face to provide the aforesaid passage, said conduit element extending above said face to prevent dust from being swept readily into the passage from the face when the cover is open.

8. In a portable altimeter, in combination, an instrument comprising a pressure-sensitive element, a lever connected to the element to be rocked thereby, an indicator-operating shaft and operating means intermediate the lever and the shaft for mechanically amplifying the displacements of the lever as extended rotative displacements of said shaft, said shaft being thereby adapted to turn through more than one revolution to cover the range of response of the aforesaid element, a dial plate disposed adjacent said instrument transversely of said shaft and carrying a plurality of concentric, successively significant scales for the instrument, a case for said altimeter to enclose the instrument and dial plate and having a transparent face for observation of the latter, an indicating pointer carried by the aforesaid shaft and disposed adjacent said dial plate to sweep the said scales, and frictionless means visibly disposed adjacent said dial plate at a locality within the periphery of the plate and including an indicating member which is mounted on and carried only by the aforesaid lever and which extends to said locality, for indicating which of the said scales is significant for the position of the pointer at any time.

9. In a measuring device, in combination, a sensitive element providing positional change over a small range in accordance with variation of a controlling condition, a lever actuated by said element and adapted to rock through substantially less than 180° to cover said range, a rotatable indicating member, displacement-amplifying transmission means between said lever and member for angularly amplified rotation of the member through substantially more than 360° in correspondence with said range, a dial plate positioned to be swept by said indicating member and having concentric scales legible in succession to delineate said range, and a supplemental indicator carried by said lever moving over a second scale representing said concentric scales, for indicating which of the latter should be read for any given position of the indicating member.

10. In a pressure measuring instrument which comprises a pressure-sensitive element, a lever connected to the element to be rocked thereby, a gear segment on said lever, and a pinion in mesh with the gear segment to be turned through more than one revolution as the lever is rocked through a predetermined range of pressure response by the first mentioned element, the combination comprising indicating means including a pointer turned by said pinion and a circular dial having a plurality of concentric scales swept by said pointer, a second pointer carried by the lever and adapted to be rocked therewith, and a scale for said second pointer, said second pointer and last-mentioned scale being exposed through an opening in the dial and associated therewith for observation simultaneously with said concentric scales, and said last mentioned scale bearing indicia correlated with the first mentioned plurality of scales so that the second mentioned pointer indicates, in number of revolutions, the angular departure of the first mentioned pointer from a predetermined end position.

11. A portable altimeter comprising in combination a pressure-responsive device which includes a pressure-sensitive element, a lever connected to the element to be rocked thereby, a gear segment on the lever and a pinion in mesh with the gear segment to be turned through more than one revolution as the lever is rocked through a predetermined range of pressure response by the first mentioned element, supporting structure for said pressure-responsive device, and a dial plate associated with said supporting structure and observable from the exterior of said case, said dial plate having indicating means comprising a pointer turned by the aforesaid pinion and a circular dial having a plurality of concentric scales swept by the pointer, a second pointer carried by the aforesaid lever and adapted to be rocked therewith adjacent the dial plate, and a scale for said second pointer, said second pointer and said last-mentioned scale being exposed through an opening in said dial plate for observation therewith, said last mentioned scale bearing indicia correlated with the concentric scales so that the second pointer indicates, in number of revolutions, the departure of the first mentioned pointer from a predetermined end position.

12. In a measuring device having a sensitive element adapted to provide positional change over a small range in accordance with a controlling condition, the combination comprising a substantially vertically disposed shaft adapted to be turned by said element, and bearing means for the shaft including a thrust bearing having a concave seat, said shaft having a tapered end engaged in said concave seat, said thrust bearing having a member of paramagnetic material at one side thereof and said shaft comprising a member of paramagnetic material, said concave seat providing a small lateral clearance for the tapered end of the shaft therein so that said shaft end can move slightly toward and away from said side of the bearing, one of said members being magnetized whereby the end of the shaft is urged into a substantially constant position against the bearing seat by attraction of one member toward the other, as the shaft is turned, said side-disposed member and said shaft member being mutually magnetically attracted to move and hold the end of the shaft forcibly sidewise against the inner surface of the seat, in said constant position toward the aforesaid side of the bearing.

13. In a sensitive instrument movement, in combination, a substantially vertically disposed shaft, bearing means therefor including a thrust bearing having a concave seat to receive an end of the shaft, and means including said shaft and a member of paramagnetic material at one side of said thrust bearing, for magnetically urging the said end of the shaft in a direction at an angle to the shaft axis, to keep the said end in a substantially constant position as the shaft is turned, said concave seat providing a small lateral clearance for the end of the shaft to permit slight movement of the shaft end toward said side of the bearing, and said shaft end being moved and held forcibly sidewise against the inner surface of said concave seat by magnetic attraction between said member and shaft.

14. In a pressure measuring instrument which comprises a pressure-sensitive element, a lever connected to the element to be rocked thereby, a gear segment on said lever, and a pinion in mesh with the gear segment, the combination comprising a substantially vertically disposed shaft for the pinion, bearing means for the shaft including a thrust bearing having a concave seat, said shaft having a tapered end engaged in said concave seat, an indicator carried by the shaft, and a permanent magnet mounted adjacent the thrust bearing, said shaft comprising paramagnetic material whereby the tapered end of the shaft is urged into a substantially constant position in the bearing seat, by said magnet as the shaft is turned, said concave seat providing a small lateral clearance for the tapered shaft end to permit slight sidewise displacement of said shaft end by the magnet, and said shaft end being moved and held forcibly against the inner surface of the concave seat, in the aforesaid position.

15. A portable pressure-responsive measuring device comprising, in combination, a case having a transparent face, said case having side wall structure, a pressure-sensitive instrument having supporting structure and disposed in wholly enclosed relation within said case, said instrument including indicating means carried by said supporting structure and disposed within the case for observation through said face, said instrument and its indicating means and supporting structure being spaced in all directions from the interior surfaces of said case, a plurality of elastic sponge elements secured to the interior of the aforesaid wall structure of the case at a corresponding plurality of localities distributively spaced around the wall structure, each of said sponge elements extending inwardly from the wall structure to an inner portion of such element, the inner portions of the elements being secured to the supporting structure of the pressure-sensitive instrument, said sponge elements supporting the supporting structure and the instrument and indicating means, in the aforesaid spaced relation within the case, said sponge elements having outer portions secured to said wall structure at the aforesaid localities, against movement of said outer portions relative to the wall structure in any direction, and the inner portions of said sponge elements being secured to the supporting structure of the instrument against movement of said inner portions in any direction relative to the instrument, and said sponge elements constituting the sole support for the instrument, supporting structure and indicating means, isolating said instrument, supporting structure and indicating means wholly inwardly of the case and resiliently in all directions.

JOHN O. KIRWAN.

REFERENCES CITED

The following references are of record in the file of this patent:

UNITED STATES PATENTS

| Number | Name | Date |
|---|---|---|
| 394,668 | Watkin | Dec. 18, 1888 |
| 624,142 | White | May 2, 1899 |
| 1,910,952 | Hensmanns | May 23, 1933 |
| 2,023,825 | Urfer | Dec. 10, 1935 |
| 2,139,059 | Lybrand | Dec. 6, 1938 |
| 2,147,108 | Rylsky | Feb. 14, 1939 |
| 2,256,804 | Hurley | Sept. 23, 1941 |
| 2,257,804 | Lord | Oct. 7, 1941 |
| 2,332,565 | Fairbank | Oct. 26, 1943 |
| 2,367,449 | Triplett | Jan. 16, 1945 |
| 2,400,411 | Hauptman | May 14, 1946 |

FOREIGN PATENTS

| Number | Country | Date |
|---|---|---|
| 193,114 | Switzerland | Dec. 1, 1937 |